United States Patent
Jost et al.

(10) Patent No.: US 10,718,373 B2
(45) Date of Patent: Jul. 21, 2020

(54) FLANGE BEARING WITH PARALLEL NOTCHES FACING EACH OTHER

(71) Applicant: FEDERAL-MOGUL WIESBADEN GMBH, Wiesbaden (DE)

(72) Inventors: Bjorn Tobias Jost, Ingelheim (DE); Stephan Deusser, Wiesbaden (DE); Rene Birnbaum, Obertiefenbach (DE)

(73) Assignee: FEDERAL-MOGUL WIESBADEN GMBH, Wiesbaden (DE)

( * ) Notice: Subject to any disclaimer, the term of this patent is extended or adjusted under 35 U.S.C. 154(b) by 0 days.

(21) Appl. No.: 16/135,367

(22) Filed: Sep. 19, 2018

(65) Prior Publication Data

US 2019/0085896 A1 Mar. 21, 2019

(30) Foreign Application Priority Data

Sep. 19, 2017 (DE) .................... 10 2017 121 653

(51) Int. Cl.
  *F16C 17/10* (2006.01)
  *F16C 9/02* (2006.01)
  *F16C 43/02* (2006.01)
(52) U.S. Cl.
  CPC ............. *F16C 17/107* (2013.01); *F16C 9/02* (2013.01); *F16C 43/02* (2013.01); *F16C 2226/76* (2013.01); *F16C 2240/30* (2013.01); *F16C 2360/22* (2013.01)
(58) Field of Classification Search
  CPC .... F16C 9/02; F16C 9/04; F16C 17/10; F16C 17/107; F16C 43/02; F16C 2226/76; F16C 2240/30; F16C 2360/22
  See application file for complete search history.

(56) References Cited

U.S. PATENT DOCUMENTS

| 4,714,356 | A | * | 12/1987 | Damour | ............. F16C 17/10 384/275 |
|---|---|---|---|---|---|
| 5,462,365 | A | | 10/1995 | Brandt | |
| 2003/0128902 | A1 | * | 7/2003 | Kennedy | ............. F16C 9/02 384/275 |
| 2010/0215300 | A1 | | 8/2010 | Schlabs | |
| 2010/0260449 | A1 | | 10/2010 | Lehmann et al. | |
| 2014/0314356 | A1 | | 10/2014 | Patel et al. | |

FOREIGN PATENT DOCUMENTS

| DE | 4303855 C1 | 6/1994 |
|---|---|---|
| DE | 102007055005 A1 | 6/2009 |
| DE | 102007044850 B3 | 8/2009 |
| EP | 0962671 B1 | 12/1999 |
| WO | 2009062904 A1 | 5/2009 |
| WO | 2013068106 A1 | 5/2013 |

OTHER PUBLICATIONS

Translation of EP0962671 obtained Jul. 2019.*

* cited by examiner

*Primary Examiner* — James Pilkington
(74) *Attorney, Agent, or Firm* — Robert L. Stearns; Dickinson Wright, PLLC

(57) ABSTRACT

A radial-axial bearing element includes a sliding bearing shell and at least one thrust washer. The sliding bearing shell has a plurality of notches that are disposed spaced apart in the circumferential direction, and the thrust washer has a plurality of corresponding connection pieces that are disposed in the corresponding notches. The notches and connection pieces have contact surfaces that rest against each other to form a positive connection. At least two of the connection pieces and notches are disposed in an outer first region and are disposed parallel to each other.

18 Claims, 7 Drawing Sheets

FLANGE BEARING WITH PARALLEL NOTCHES FACING EACH OTHER

CROSS-REFERENCE TO RELATED APPLICATION

This U.S. Utility Patent Application claims priority to German Patent Application No. 10 2017 121 653.7, filed Sep. 19, 2017, the entire contents of which are incorporated herein by reference.

BACKGROUND

1. Technical Field

The invention relates to a radial-axial bearing element with a sliding bearing shell and at least one thrust washer, particularly in form of a semi-circular, annular disc, wherein the sliding bearing shell has at least on one of the axial front sides thereof a plurality of notches that are disposed spaced apart in the circumferential direction, and wherein the thrust washer has a plurality of connection pieces on the radially inner edge thereof that are disposed spaced apart from each other in the circumferential direction, radially inwardly facing, and that engage in the corresponding notches to form a positive-locking connection with the sliding bearing shell. The notches each have a contact surface that faces away from a first center plane of the radial-axial bearing element, and the connection pieces each have a contact surface that faces toward the first center plane, which rest against each other to form the positive-locking connection. The "first center plane" in the sense of this text denotes a plane with an axial and a radial orientation through the centerline defined by the sliding bearing shell and the apex thereof.

2. Related Art

The connection between the sliding bearing shells and the thrust washers has been the subject-matter of continuous improvements for a long time. Reference is made, for example, to the citations DE 43 03 855 C1, DE 10 2007 055 005 A1, EP 0 962 671 B1, DE 10 2007 044 850 B3, WO 2009/062904 A1 and WO 2013/068106 A1. While many improvements seek to simplify the installation of the so-called built-up flange bearings, where the thrust washer is connected to the sliding bearing shell by forming a positive-locking while providing a undetachable connection between the thrust washer and the bearing shell at the same time, the present invention relates to the problem of providing an improved load-bearing capacity of the axial bearing, i.e. the thrust washer.

The citation WO 2009/062904 A1 addresses a similar issue. It proposes disposing a radially inwardly facing outer connection piece for the connection with a sliding bearing shell on both sides of the first center plane, respectively, wherein the inner edges that face toward the first center plane form, on the inner side, an angle with a tangent that is applied to the semi-circle described by the thrust washer, which is between 45° and 85°. This improves the positive-locked connection between the thrust washer and the radial bearing part relative to the specific load situations that occur on radial-axial bearings of this class.

This load situation is explained in further detail based on FIG. 8, which shows a radial-axial bearing element 70 as disclosed in the citation WO 2009/062904 A1. The radial-axial bearing element 70 includes a sliding bearing shell 71 and a thrust washer 72, and it is shown from an axial perspective. The thrust washer 72 includes a plurality of connection pieces 73, 73', 73" that are disposed spaced apart in the circumferential direction and engage in the corresponding notches inside the sliding bearing shell 71 forming a positive-lock. This way, the thrust washer 72 is secured against rotation in the circumferential direction relative to the sliding bearing shell 71.

A shaft that is supported in the radial-axial bearing element (not shown) rotates in the direction as identified by the arrow 74. A cheek (also not shown) of the shaft that is supported against the thrust washer 30 applies a torque in the tangential direction. It has been found that the main load is active in the initial region 75 of the thrust washer 72, referred to hereafter as the main load area, where the greatest wear is regularly detected. That is why the torque that is transferred to the thrust washer 72 acts essentially in the direction as characterized by the arrow 76. It is obvious that, in this situation, the greatest load-bearing capacity is required of the connection piece 73, which is in the closest proximity to the initial region 75 and the corresponding notch.

FIG. 9 shows the installation situation of the radial-axial bearing element having the bearing shell 71 and the thrust washer 72. This radial-axial bearing element is installed inside an engine block 80 and supports a crankshaft 82, which rests by a cheek 84 against the thrust washer 72. To avoid any contact between the bearing element and the crankshaft in the transitional region between the radial part 82 and the cheek 84, the shaft has an undercut 86, i.e. a radial indentation, in this transitional region. An undercut having the measure S is thereby ensured between the radial-axial bearing element and the shaft. Due to cost considerations and stability concerns and/or weight savings considerations, the engine builder is interested in making the radius as large as possible, while, nonetheless, foregoing any such undercut 86. This is the reason why bearing manufacturers are increasingly tasked with constructing radial-axial bearing elements with an adequate undercut S. This is achieved at the expense of the contact surfaces by which the connection pieces 73 rest against the corresponding notches in the sliding bearing shells 71, which in turn has negative effects for the maximum application of force at this location. Consequently, the measure for improving the load-bearing capacity of the axial bearing as specified in WO 2013/068106 A1 no longer suffices in all cases when modern engines are involved.

SUMMARY

It is therefore the object of the present invention to provide a radial-axial bearing element with an improved load-bearing capacity. As a further object, the invention proposes to design the radial-axial bearing element in such a manner that it can be manufactured cheaply and installed easily.

The invention provides that the radial-axial bearing element of the kind as mentioned in the introduction has at least two connection pieces and at least two corresponding notches in a first region that is an outer region in the circumferential direction, wherein the contact surfaces of the at least two connection pieces and the at least two notches in the outer region are disposed parallel to each other.

Two or more connection pieces and notches in the first outer region, meaning in proximity of the main load area of the thrust washer, double or multiply the effective contact area in places where the greatest load is carried, thereby also almost doubling or multiplying the load-bearing capacity overall. The parallel arrangement of the contact surfaces of the connection pieces and of the contact surfaces of the notches facilitates the production of the at least two front-side notches in a single work step by means of stamping. It must be noted that the notches are stamped in the sliding bearing shell that has been shaped into a semicircular form, not already in the plane board prior to reshaping. The reason for the above is the required dimensional accuracy that is needed, among other reasons, to ensure an even load distribution over the contact surfaces on both connection pieces and notches.

Of course, parallelism must only be achieved within the scope of the manufacturing-specific tolerances. Accordingly, "parallel" is understood as an alignment of the contact surfaces within a tolerance of ±2°, preferably ±1°. This parallelism, in connection with the manufacturing step of the stamping from the reshaped sliding bearing shell, ensures that, in practice, the load is distributed evenly over at least two notches and connection pieces. A further advantage of the parallel alignment of the contact surfaces of the notches is the fact that the stamping process may be executed in a single work step and with the use of a single tool, whereby the manufacturing time and thereby also the manufacturing costs are not significantly increased in comparison to a simple notching.

An advantageous improvement of the invention provides that the first outer region extends in the circumferential direction over an angle α measuring 0° to 55°, preferably 5° to 50°, plotted about the centerline from a partial plane of the radial-axial bearing element.

The partial plane is the plane that connects the two circumferential end faces of the sliding bearing shell. The first outer region is defined from this partial plane in the peripheral direction to the first center plane by an angle α in the indicated range, whereby the first outer region is sufficiently congruent with the main load area of the tangential forces that act upon the thrust washer, whereby the improved load-bearing capacity is ensured.

It is further preferred that the contact surfaces of the at least two connection pieces and the at least two notches in the first outer region enclose an angle γ that measures between 0° and 45°, preferably between 15° and 40°, with the partial plane of the radial-axial bearing element.

Small angles γ are particularly preferred regarding the load-bearing capacity; specifically angles between 0° and 20° ensure that the force that is introduced into the main load area is essentially perpendicular relative to the contact surfaces. Larger angles, particularly angles between 20° and 55°, are preferable from a manufacturing perspective, because they cam be produced with a straight stamping tool, while particularly angles between 0° and 20° require an offset stamping tool that must be guided parallel or almost parallel relative to the partial plane during the stamping.

It is further preferred for the notches, respectively, to have connection surfaces that face toward the first center plane and for the connection pieces, respectively, to have connection surfaces that face away from the first center plane, wherein the connection surfaces and the contact surfaces of the at least two connection pieces and the at least two notches in the outer region are disposed parallel to each other.

The connection surfaces are the lateral boundary regions of the notches and the connection pieces, respectively, that are disposed opposite of the respective contact surfaces. Due to the cost-effective manufacturing stamping as described above, as a result, at least the connection surfaces of the notches are also disposed parallel to each other, and said geometry is subsequently preferably also chosen for the connection surfaces of the connection pieces.

To elaborate further, it must be noted in the present context that the connection pieces are termed as "radially inward facing" independently from the orientation of the contact and connection surfaces thereof. The contact surfaces, at any rate, cannot be radially inward facing for all the connection pieces, which is due to the circumstance that the contact surfaces are a plurality of connection pieces that are parallel to each other. Nonetheless, the connection pieces for the most part have a radially inward facing orientation.

It is further preferred for the thrust washer and the sliding bearing shell to have at least two connection pieces and at least two corresponding notches in a second outer region in the circumferential direction opposite to the first outer region, wherein the contact surfaces of the at least two connection pieces and the at least two notches in the second outer region are disposed parallel to each other.

This way, it is ensured that identical radial-axial bearing elements are equally suited for left-turning and for right-turning installations, wherein the parallel arrangement of the contact surfaces provides also in the second outer region a correspondingly increased load-bearing capacity in a simple manner. This means it is not necessary to stockpile different bearing elements, and any confusion during the installation is precluded.

Corresponding to the first outer region, the second outer region also preferably extends over an angle α' measuring 0° to 55°, preferably 5° to 50°, plotted about the centerline of the partial plane of the radial-axial bearing element. The contact surfaces of the at least two connection pieces and the at least two notches in the second outer region accordingly preferably enclose an angle γ' that measures between 0° and 45°, preferably between 15° and 40°, with the partial plane of the radial-axial bearing element. Similarly, here too, the notches in the second outer region have, respectively, connection surfaces that face the first center plane, and the connection pieces in the second outer region, respectively, have connection surfaces that face away from the first center plane, wherein the connection surfaces and the contact surfaces of the at least two connection pieces and the at least two notches are disposed parallel to each other in the second outer region.

Particularly preferably, the notches in the first outer region are, in relation to the first center plane, disposed symmetrically relative to the notches in the second outer region. Similarly the connection pieces in the first outer region are, in relation to the center plane, preferably symmetrical relative to those in the second outer region.

It is further preferred that the sliding bearing shell has at least one middle notch in a region that is central in the circumferential direction on at least one of the axial front sides thereof, and that the thrust washer has at least one middle connection surface at the radially inward facing region thereof that engages in the corresponding middle notch thus forming a positive-locked connection with the sliding bearing shell.

The region that is central in the circumferential direction preferably extends in an angular range β of 50° to 130°, particularly preferably of 60° to 120°, plotted around the centerline from the partial plane of the radial-axial bearing element.

These positive-locked middle connection pieces and the notches achieve an additional increase of the load-bearing capacity.

It is further preferred that the thrust washer and the sliding bearing shell are fixed in place by a welded connection.

The primary purpose of this welded connection is to ensure that the thrust washer and the sliding bearing shell are captively connected to each other prior to installation. At this point, it is to be noted that the sliding bearing shell typically has a spread, meaning, the basic shape thereof is not exactly semicircular but, contrary to the thrust washer, slightly bended open (typically by a few tenths of a mm). Usually, this spread must be removed during the installation of the sliding bearing shell and the thrust washer, until the connection pieces are align inside the notches. When the sliding bearing shell is subsequently released, the elastic restoring force ensures the non-positive cohesion of the bearing shell and thrust washer after the installation. When the radial-axial bearing element is installed in the bearing seat thereof, the spread is also removed in that the bearing shell is compressed while being inserted. This results in the non-positive connection between the sliding bearing shell and the thrust washer to be removed at least in part, such that the thrust Washer may no longer be safely held in the desired position. To avoid any related installation errors this may cause, the thrust washer is, moreover, preferably fixed in place on the sliding bearing shell by means of a weld point.

It is particularly preferred for the welded connection to be a predetermined breaking point that breaks when the counter rotor to be supported starts rotating.

This goal can be achieved by an adequately small weld point.

A further advantageous design of the radial-axial bearing element according to the invention provides that the sliding bearing shell has notches disposed on both of its axial front sides and that two thrust washers are provided that are disposed axially opposite thereto having connection pieces that engage in the corresponding notches in order to achieve a positive-locking connection with the sliding bearing shell. Each of the thrust washers and both front sides have the same connection pieces and/or notches with the previously described features.

The improved load-bearing capacity of the axial bearing is then guaranteed on both sides of the radial-axial bearing element.

Further preferred, the thrust washer has at least one radially inward facing support on the radial inner edge thereof that is designed to rest against an outer circumferential area of the sliding bearing shell (back of the bearing).

As a matter of principle, the thrust washer and the bearing shell need a certain degree of play to ensure that the thrust washer rests all over against the housing following the installation. Therefore, there exists a degree of play in the assembled state, even if said play is as small as possible and which is removed, however, during operation. In this sense, the support is "designed to rest against the back of the bearing."

Relative to the first center plane, this at least one support is particularly preferably disposed in a second, relative to the circumferential direction, outer region relative to the first outer region.

This is the location where the thrust washer is supported most effectively in the main load area against the bearing shell, when the load torque that was described in the introduction is applied.

The mentioned welded connection, particularly the weld point, preferably connects one or a plurality of the supports of the thrust washer to the back of the bearing. The tack weld therein in preferably applied on the front side in order to avoid creating unevenness on the rear of the thrust washer.

THE DRAWINGS

Further advantages and characteristics of the invention will be explained below based on the figures. Shown are as follows.

DETAILED DESCRIPTION

Figure 1:
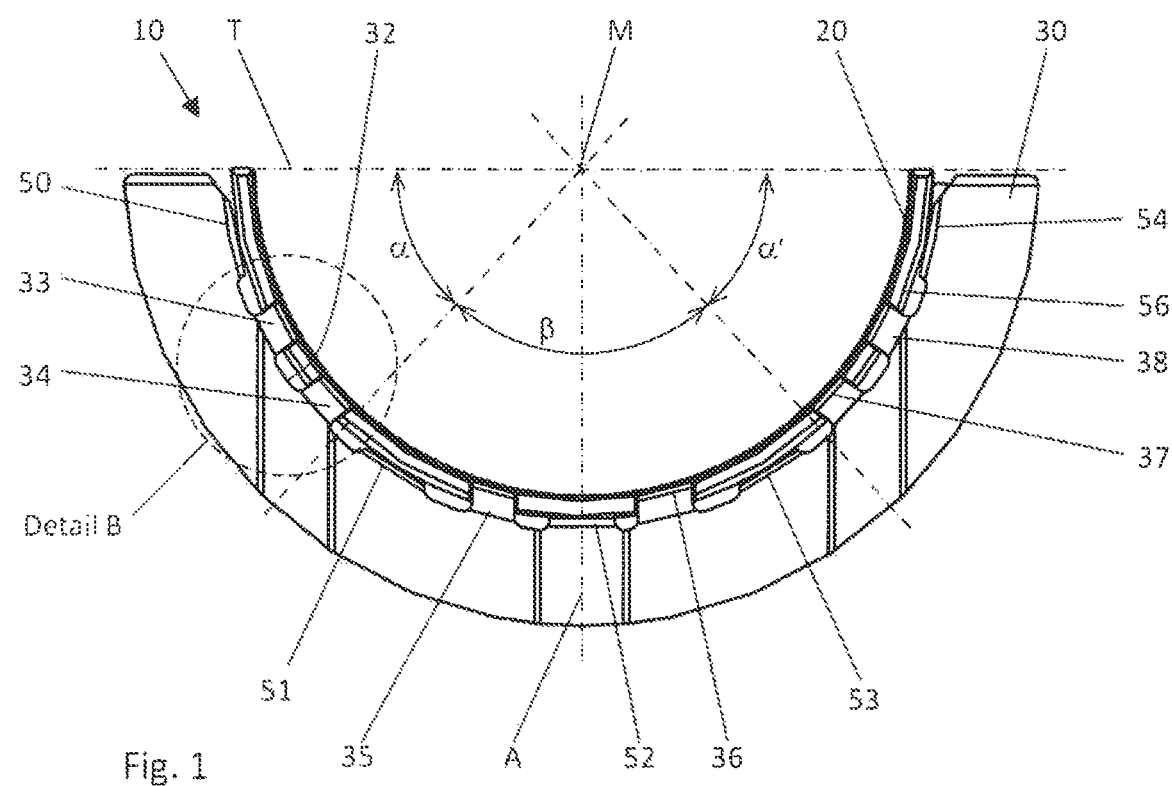
FIG. 1 is a first embodiment of the radial-axial bearing element according to the invention seen from an axial perspective.
Figure 2:
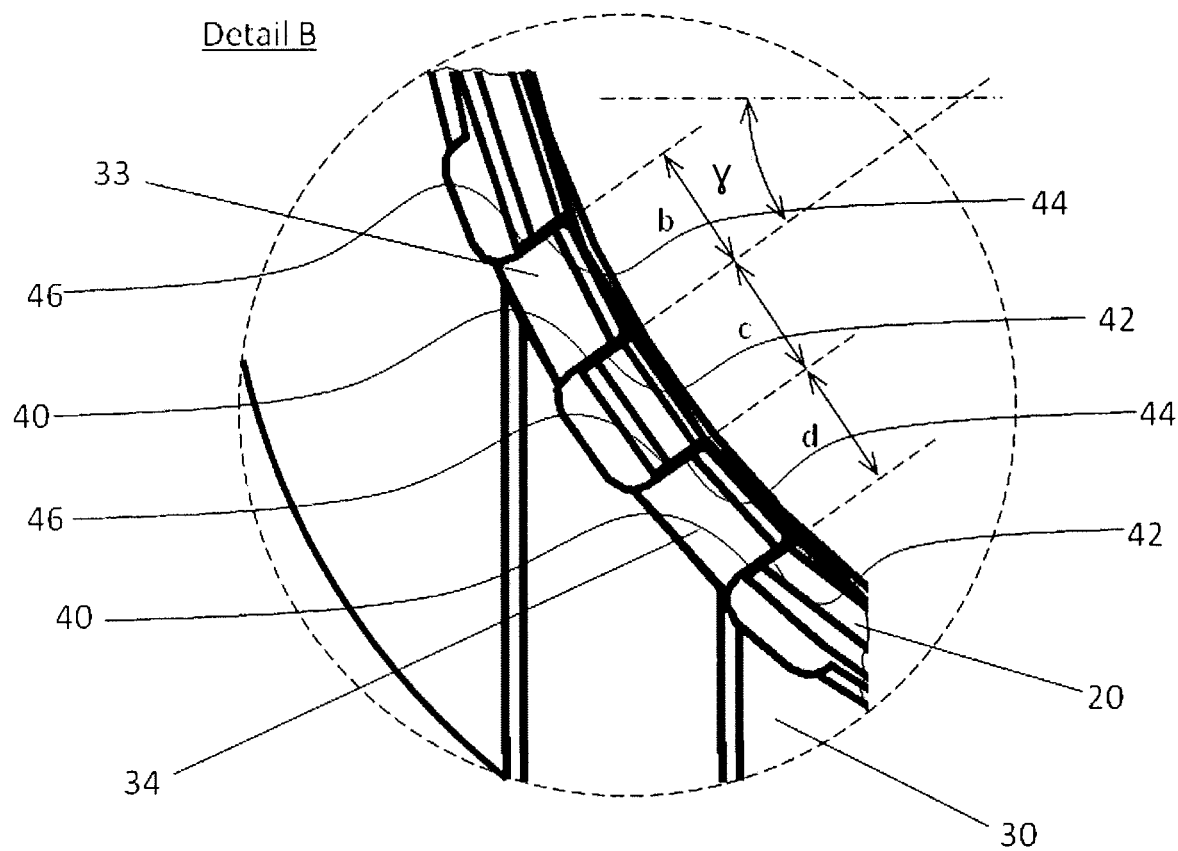
FIG. 2 is a detail from FIG. 1 in an enlarged view.
Figure 3:
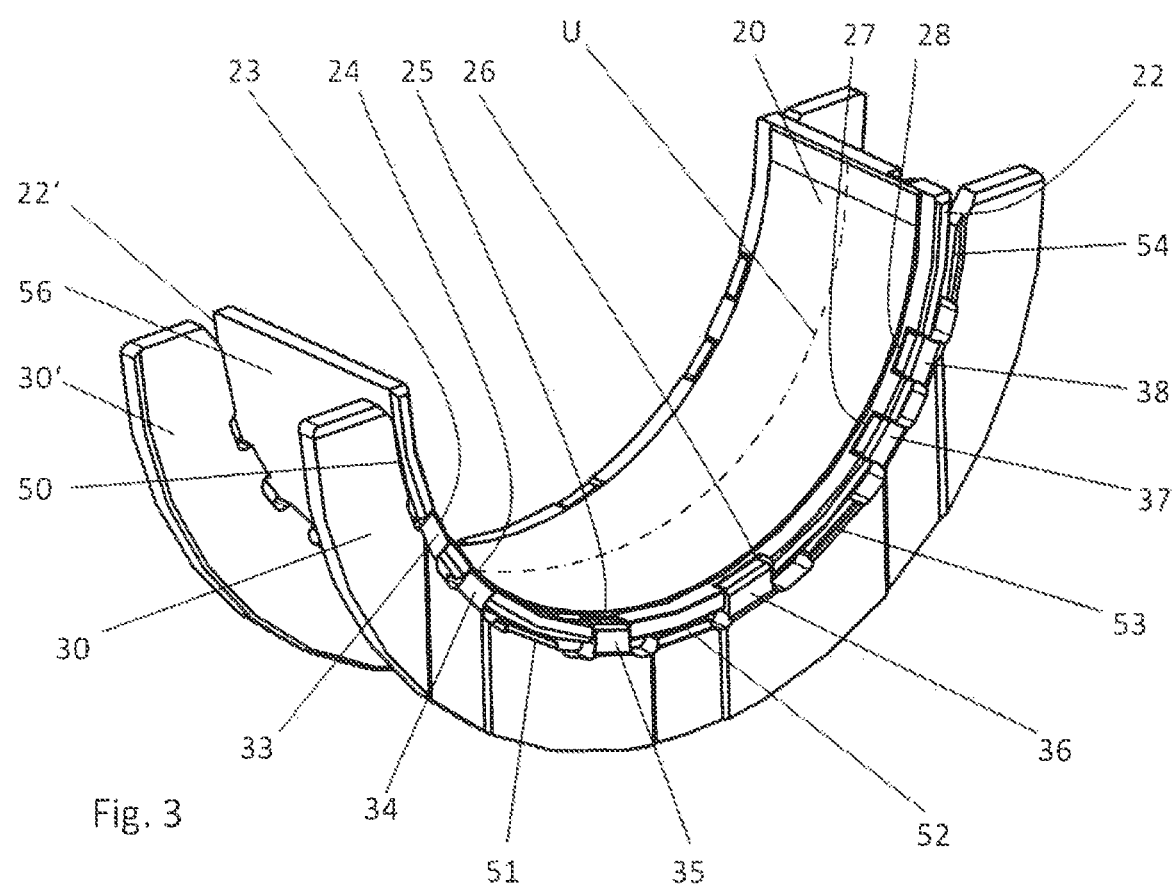
FIG. 3 is a perspective view of the first embodiment of the radial-axial bearing element.

FIGS. 1 to 3 show a first embodiment of the radial-axial bearing element according to the invention 10. FIG. 1 is a representation of an axial perspective the detail B has been extracted from and is shown in FIG. 2 on an enlarged scale. The perspective view in FIG. 3 shows that the radial-axial bearing element 10 includes a sliding bearing shell 20 and two thrust washers 30, 30', which are disposed opposite each other on the sliding bearing shell 20 in the axial direction. As the radial-axial bearing element has identical features on both axial sides, the description below will be limited mainly to the characterizing features on one side.

For the connection between the sliding bearing shell 20 and the thrust washer 30, the sliding bearing shell 20 has, on both axial front sides 22, 22', a plurality of notches 23, 24, 25, 26, 27 and 28 that are disposed spaced apart in the circumferential direction. The two thrust washers 30, 30' have a plurality of connection pieces 33, 34, 35, 36, 37, 38 on the radially inner edge 32 thereof that are disposed spaced apart in the circumferential direction, radially inward facing, and that engage in the notches 23, 24, 25, 26, 27, 28 to form a positive connection with the sliding bearing shell 20.

"M" denotes the centerline of the radial-axial bearing element. A first center plain A extends through the centerline M and through the apex of the sliding bearing shell 20. A partial plane T extends perpendicularly thereto through the circumferential end faces of the sliding bearing shell 20.

As seen in FIG. 1, the thrust washers 30 are somewhat shorter than the sliding bearing shell 20 in the circumferential direction, which is why they end ahead of the partial line T. This is necessary to achieve the needed certain degree of play of the thrust washers after the installation of the axial-radial bearing elements, which ensures that the sliding bearing shell 20 can be inserted under tension with a second sliding bearing shell, while compressing the circumferential end faces, inside the bearing seat.

The radial-axial bearing element is subdivided in three regions in the circumferential direction; these are a first outer region in the circumferential direction characterized by the angle $\alpha$, a middle region characterized by the angle $\beta$, and in a second outer region in the circumferential direction characterized by the angle α'. Relative to the center plane A, the second outer region in the circumferential direction α' is located opposite to the first outer region α. The first and second outer regions α, α' extend within an angle α measuring between 0° to 55°, particularly preferred between 5° and 50°, and the middle region extends in an angular range β measuring between 50° and 130°, particularly preferred between 60° and 120°. It is to be noted that the sum of the regions may not exceed 180° because overlaps of the regions are, by definition, not permissible.

Disposed in the outer regions α, α' are the two connection pieces 33 and 34 and/or 37 and 38, respectively, and the two respectively corresponding notches 23 and 24 and/or 27 and 28. With regard to the two connection pieces and the two notches, the sliding bearing shell 20 and the thrust washer 30 are disposed symmetrically relative to the first center plane A in the outer regions α, α'. The following detailed description of the notches 23, 24 and the corresponding connection pieces 33, 34 therefore applies by analogy also for the notches 27, 28 and/or connection pieces 37, 38 disposed opposite to the former.

The notches 23, 24 each have a contact surface 40 facing away from the first center plane A of the radial-axial bearing element 10 and one connection surface 44 facing toward the first center plane A, compare FIG. 2. In the reverse orientation, respectively, the connection pieces each have a contact surface 42 facing toward the first center plane A and a connection surface 46 facing away from the first center plane A, "Facing away" in this context denotes that the respective area is not visible from the first center plane because, from this perspective, the same is located on the rear of the notches and/or the connection pieces, respectively. Correspondingly, "acing towards" denotes that the respective area is visible from the first center plane A.

Figure 7:
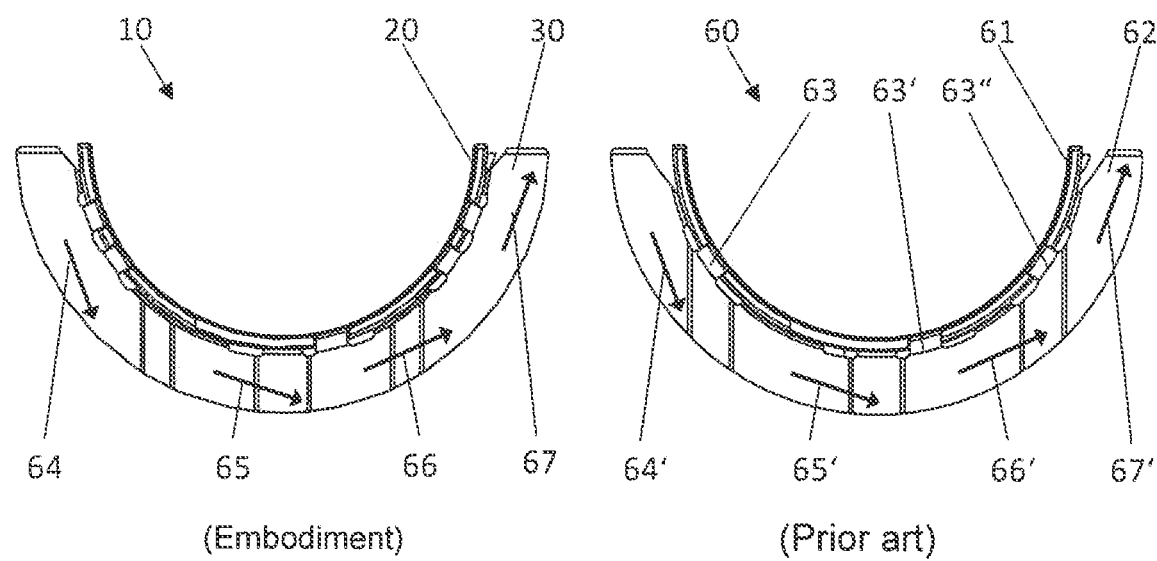
FIG. 7 is the first embodiment in a comparison with a radial-axial bearing element according to the prior art.

If the thrust washer 30 is loaded in the manner as described in reference to FIG. 7 and thereby moved as far as possible in the direction of the arrow 76, the contact surfaces 40 and 42 of the notches 23, 24 and of the connection pieces 33, 34 that face each other come to rest against each other, whereby the thrust washer 30 cannot be moved any further in this direction relative to the sliding bearing shell 20.

All contact surfaces 40, 42 and all connection surfaces 44, 46 are aligned parallel to each other, whereby on the one hand, an all-over areal contact is achieved, and on the other hand, the notches 23, 24 can be manufactured in a single stamping step. The contact surfaces 40, 42, 44, 46 and the partial region T, which extends horizontally in this representation, form an angle γ.

The angle γ measures preferably between 0° and 45°, particularly preferably between 15° and 40°. In this embodiment, the top notch 23 has a width b in the circumferential direction, the bottom notch 24 has a width d, and the two corresponding connection pieces 33, 34 have a circumferential distance c, wherein, in this example, the measures are equal b=c=d. But this is not compulsory. To the contrary, it can be advantageous for the width d of the bottom connection piece 34 to be greater than the width b of the top connection piece 33, and wider than the circumferential distance c. The reason for this is related to the fact that the angle between the two parallel contact surfaces 42 of the connection pieces 33 and 34 and the respectively associated tangent on the inner periphery becomes more acute in the direction toward the center plane A. This means that, in comparison to the connection piece 33, it is more difficult for the connection piece 34 to slide off. And this in turn means that the connection piece 34 can carry and/or transfer a greater load, as a function of the geometric configuration thereof (diameter of the thrust washer and the measure of the angle which is why it is preferably executed more stably overall, meaning wider.

Except for the connection pieces 33, 34 and 37, 38 in the first and second outer regions, the thrust washer 30 further includes two middle connection pieces 35, 36 that engage in corresponding notches 25, 26 on the axial front side 22 of the sliding bearing shell. This positive-locking connection also serves for fixing the thrust washer 30 in place on the sliding bearing shell 20.

The figures clearly show the difference in the widths of the middle connection piece 35 and the middle connection piece 36. This difference serves in furtherance of a reliable installation, in that it is thus avoided that the thrust washer 30 is inadvertently installed with the glide bearing shell 20 while it has a wrong orientation.

FIG. 1 further shows, for example, that the thrust washer 30 has a plurality of radially inward facing supports 50, 51, 52, 53 and 54 that radially protrude from the radially inner edge 32 thereof, radially inward. The supports rest by the radially inward surfaces thereof against an outer circumferential region 56 of the sliding bearing shell 20 and thus define the set position of the thrust washer 30 relative to the sliding bearing shell 20 in the radial direction.

The thrust washer 30 and the sliding bearing shell 20 are preferably welded together at the site of at least one of the supports 50, 51, 52, 53 and 54 (not shown in the figures).

The preceding description applies in identical fashion relative to the connection between the second thrust washer 30' and the sliding bearing shell 20. The radial-axial bearing element has the same appearance when seen from either of the opposite perspectives. Thus, the two thrust washers 30, 30' are configured identically, thereby further simplifying the production thereof, because only one tool is needed for the manufacture of both thrust washers.

Figure 4:
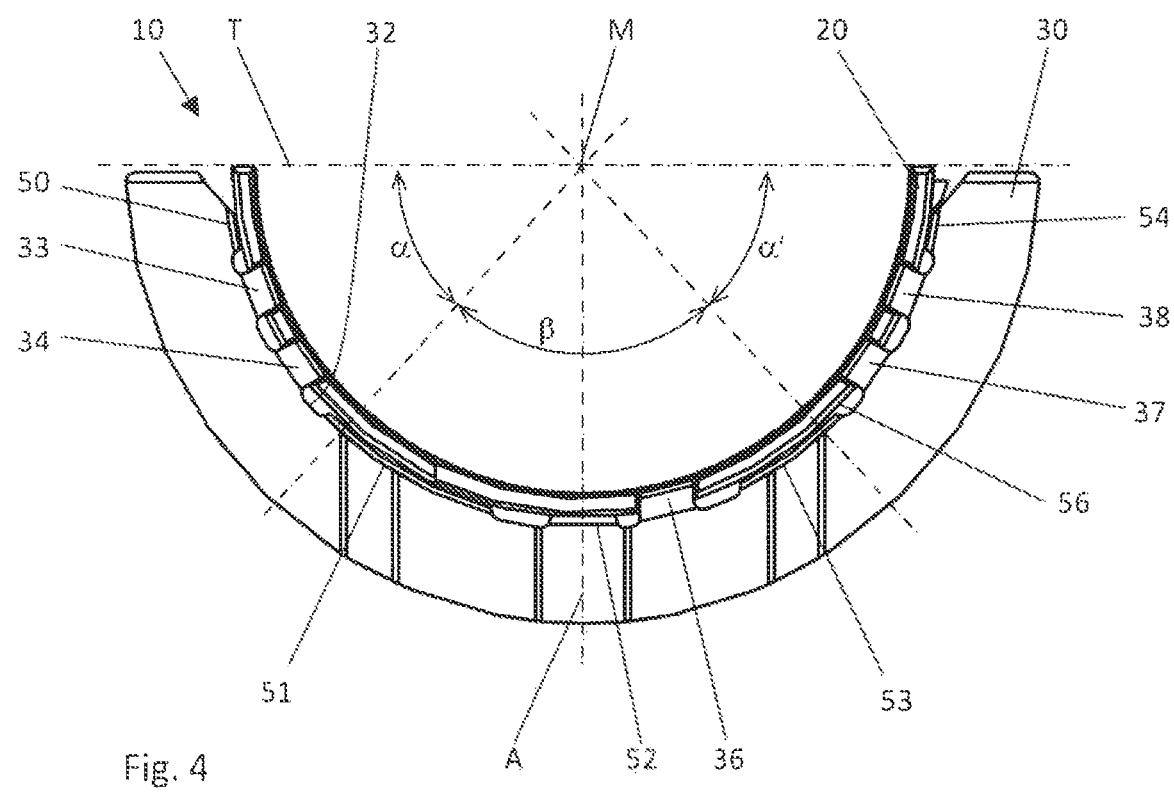
FIG. 4 is a second embodiment of the radial-axial bearing element according to the invention seen from an axial perspective.
Figure 5:
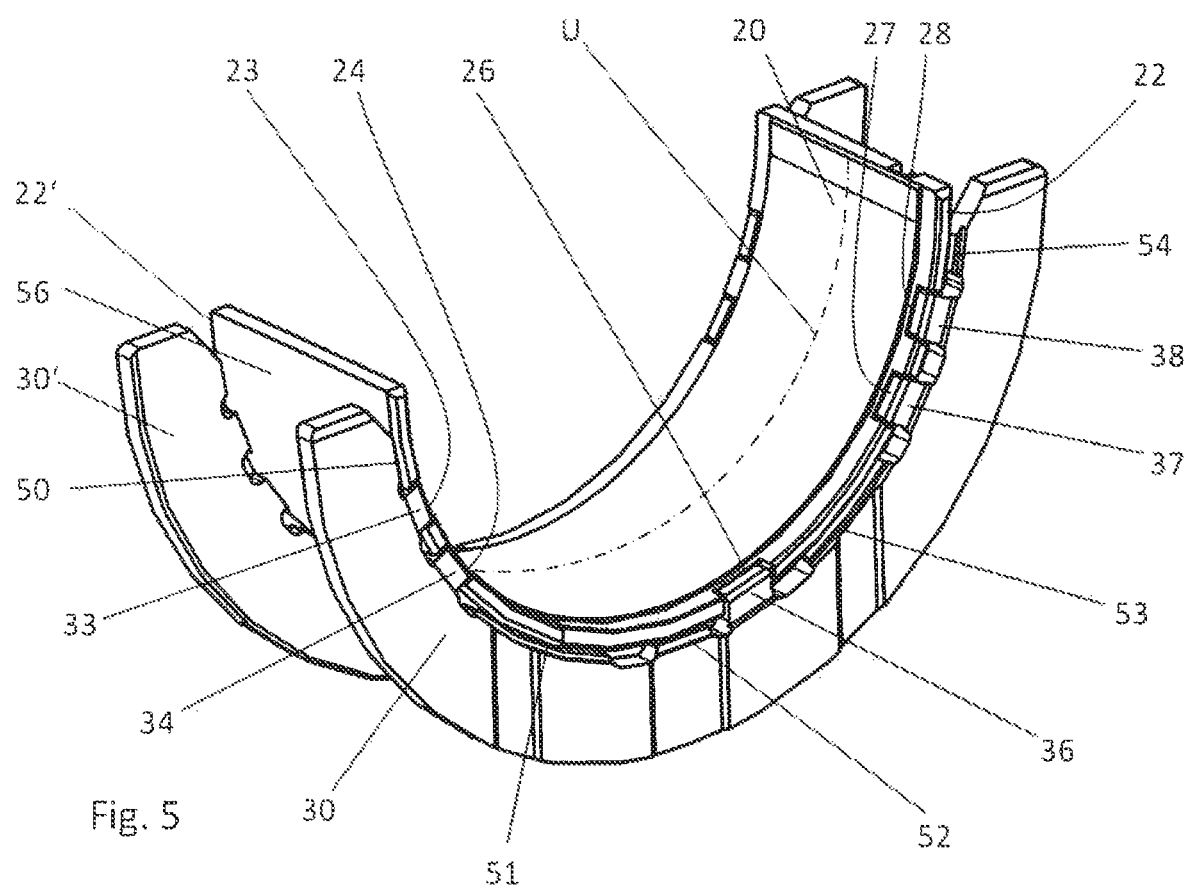
FIG. 5 is a perspective view of the second embodiment of the radial-axial bearing element.
Figure 6:
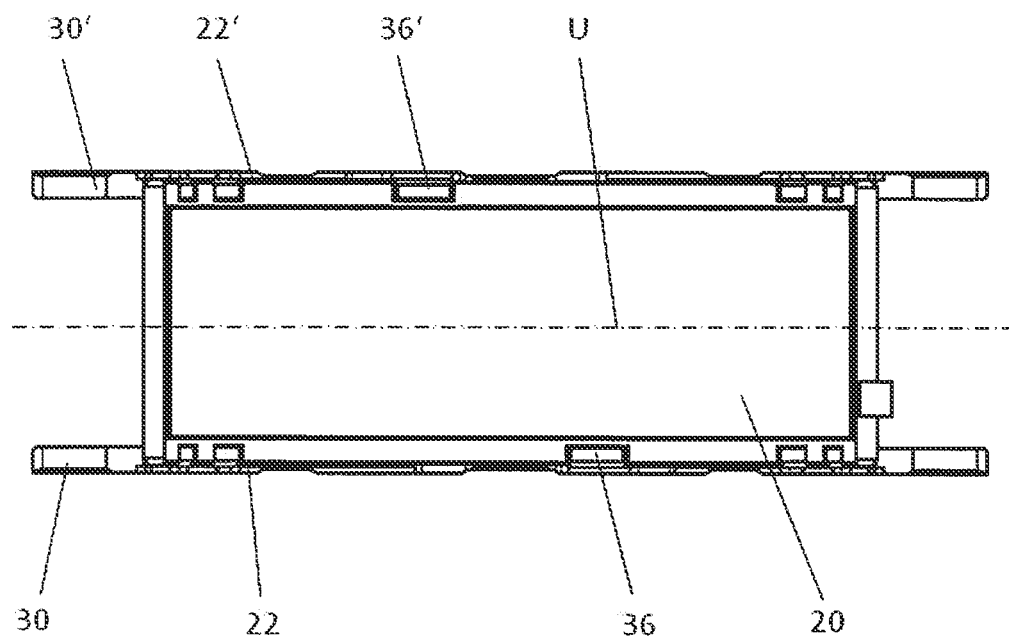
FIG. 6 is a top view of the partial plane of the radial-axial bearing element from the second embodiment.

FIGS. 4 to 6 show a second embodiment of the radial-axial bearing element according to the invention. One difference relative to the first embodiment is the fact that the two connection pieces 33, 34 and 37, 38, respectively, are in the outer regions α, α', and that the corresponding two notches 23, 24 and 27, 28 are located somewhat further to the outside in the circumferential direction, in closer proximity of the partial plane T. A further difference is the fact that only a single middle connection piece 36 and a corresponding middle notch 26 are envisioned in the middle region β, where the connection piece 36 engages to form a positive connection. Because the connection piece 36 and the corresponding notch 26 are laterally offset relative to the center plane A, here too, there is no symmetry, which is why any inadvertent turning of the thrust washer 30 during the installation of the sliding bearing shell 20 is precluded. Yet another difference is the fact that the widths of the top notch 23(b) and of the bottom notch 24(d) are the same, but the circumferential distance between the two corresponding connection pieces 33, 34(c) was selected as smaller for the reasons as indicated above (b=d>c). A final difference between the two embodiments is the fact that the support 51, in the case of the embodiment that is shown in FIGS. 4 to 6, is longer in the circumferential direction than the former because the second middle connection piece 35 is missing, and the space that has thereby been freed up can be used for said purpose as indicated above.

FIG. 6 shows that the two thrust washers 30, 30' are identical on the opposite sides 22, 22' of the sliding bearing shell 20 and that they are installed rotated by 180° in the visualization plane, whereby there is no mirror symmetry relative to the center plane U in the longitudinal direction of the glide bearing shell 20. As outlined previously, this reduces the manufacturing costs because the same thrust washer can be used on both sides. It must be noted therein that the main load area is arranged on the two thrust washers 30, 30' at least approximately opposite on both sides of the center plane U. Accordingly, this is why a symmetry of the respectively two connection pieces 33, 34 and 37, 38 and the corresponding two notches 23, 24 and 27, 28 is advantageous in the outer regions α, α' relative to the center plane A.

As a matter of principle, the middle connection pieces 35, 36 and the corresponding notches 25, 26 can be omitted altogether. Even in this instance it is possible to remove the mirror symmetry relative to the center plane A in order to rule out any inadvertent turning of the thrust washer during the assembly thereof with the sliding bearing shell, for example, in that one or several of the outer connection pieces 33, 34 have different widths in the circumferential direction in the first outer region a relative to the outer connection pieces 36, 37 in the second outer region α', or in that they are spaced apart differently; and the same applies vices versa for the corresponding notches 23, 24 and 27, 28 in the side bearing shell.

Figure 8:
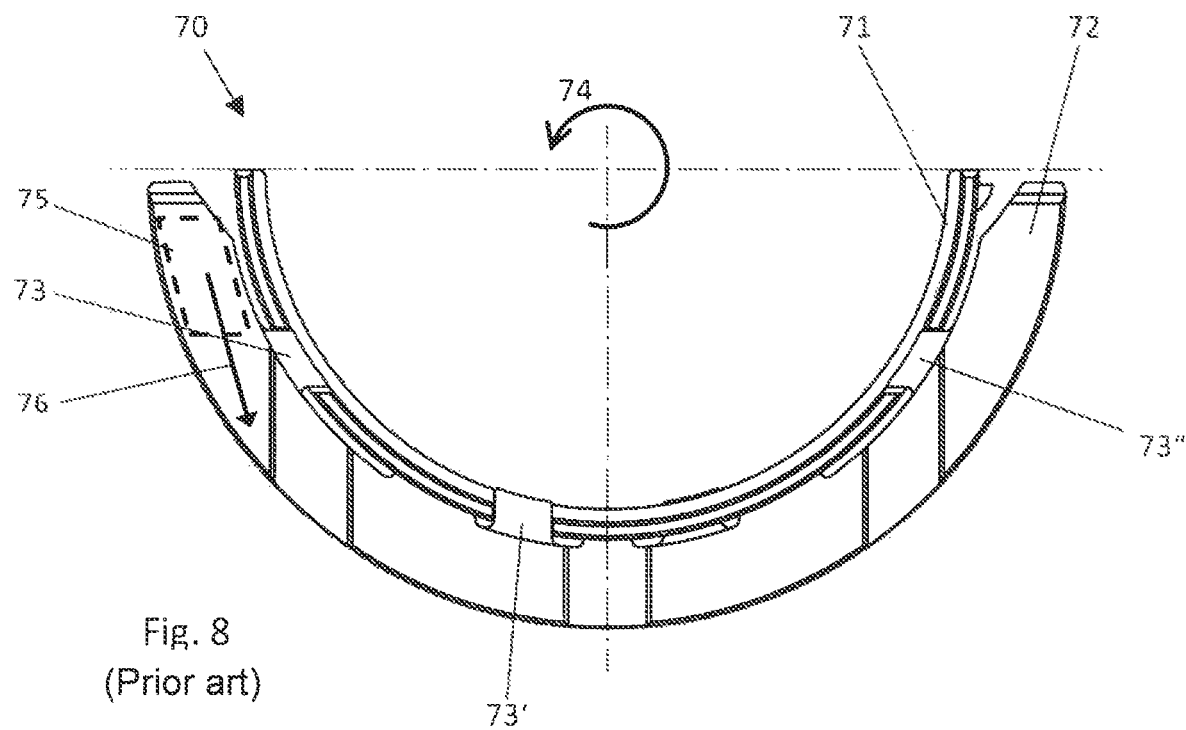
FIG. 8 is a radial-axial bearing element according to the prior art.
Figure 9:
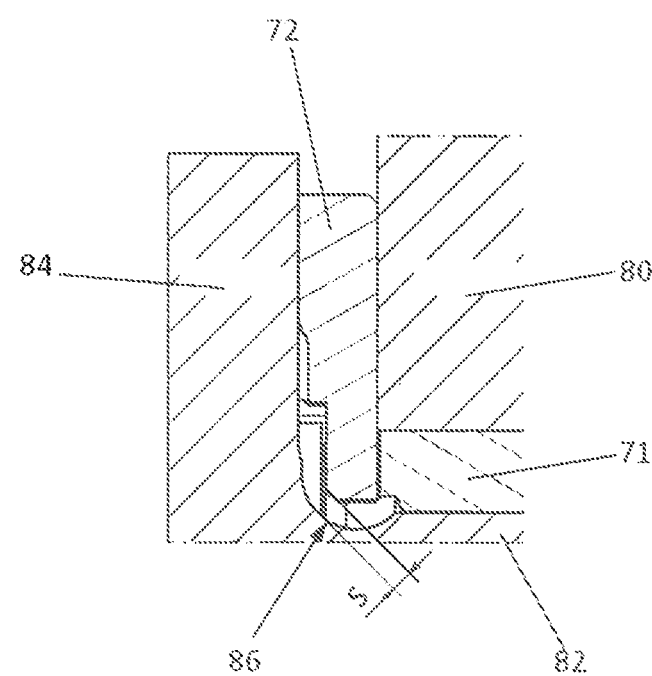
FIG. 9 is a sectional view illustrating the installation of a radial-axial bearing element according to the prior art.

FIG. 7 shows a juxtaposition of the radial-axial bearing element according to the invention 10 from FIG. 1 with a known radial-axial bearing element 60 for purposes of illustrating different load conditions. The known radial-axial-bearing element 60 has a sliding bearing shell 61 with only three notches that are circumferentially spaced apart and one thrust washer 62 with three corresponding connection pieces 63, 63' and 63". Contrary to the known radial-axial bearing element from FIG. 8, the contact surfaces of the connection pieces 63, 63' and 63" and the corresponding notches are aligned radially rather than in parallel relative to the partial area.

Also shown are four load components that engage on each of the thrust washers 30, 62 and that are designated by the arrows 64, 65, 66, 67 and/or 64', 65', 66', 67'. The load components engage, respectively, at four different locations on the surface of the thrust washer, characterized by the starting point of the arrows, and they act in the tangential direction, which is designated by the direction of the arrows.

Four different load situations were simulated as proof for the improved load-bearing capacity of the radial-axial bearing element according to the invention 10. The first load situation $L_1$ is the load case that has been described in the beginning and that is the most frequently encountered load case, where the main load is applied in the starting region of the thrust washer. This corresponds to the isolated incidence of the load component 64 and/or 64' in the left top segment of the thrust washers 30, 62 in FIG. 7. The second load situation $L_2$ corresponds to an isolated incidence of the load component(s) 65 and/or 65' in the left bottom segment of the thrust washers 30, 62. The third load situation $L_3$ corresponds to a simultaneous incidence of the load components 65 and 66 and/or 65' and 66' in the left and right bottom segments of the thrust washers 30, 62. The fourth load situation $L_4$ finally corresponds to the simultaneous incidence of all four load components 64, 65, 66 and 67 and/or 64', 65', 66' and 67' in all segments of the thrust washers 30, 62.

The maximum load transfer to the sliding bearing shell 20 and/or 61 was determined for these four load situations prior to the load-induced connection failure. The following Table 1 shows the results. By way of the design of the connection pieces and notches according to the invention, it was possible to increase the maximum load as a function of the load situation by at least 65% for load situation $L_1$ and by maximally 160% for load situation $L_2$.

TABLE 1

| Load situation | Maximum torque [Nm] Known bearing element 60 | Maximum torque [Nm] Bearing element according to the invention 10 |
| --- | --- | --- |
| $L_1$ | 19.4 | 32 (165%) |
| $L_2$ | 35.6 | 92.6 (260%) |
| $L_3$ | 53.3 | 89.8 (168%) |
| $L_4$ | 77.9 | 146.9 (189%) |

Moreover, the load-bearing capacity can be increased even further by disposing not only two hut three, four or further connection pieces in one or both or the outer regions α, α', wherein it must be considered that the material cross-section of the connection piece as well as the material bar between the corresponding notches is large enough to withstand the shearing forces that are generated at this location when a load acts upon the thrust washer. To keep the manufacturing complexity low, the contact surfaces and the connection surfaces of the connection pieces and/or the corresponding notches are preferably all parallel, but at least disposed in parallel pairs.

Obviously, many modifications and variations of the present invention are possible in light of the above teachings. It is, therefore, to be understood that the invention may be practiced otherwise than as specifically described while still being within the scope of the invention.

What is claimed is:

1. A radial-axial bearing element, comprising:
a sliding bearing shell having an axial front side formed with a plurality of notches that are spaced apart in the circumferential direction;
at least one thrust bearing having a radially inner edge and a plurality of circumferentially spaced connecting pieces projecting from the radially inner edge of the at least one thrust bearing and received in corresponding ones of the notches of the bearing shell;
wherein the corresponding notches and connecting pieces each have contact surfaces arranged transverse to the circumferential direction that are engaged with one another to form a positive-lock connection of the at least one thrust washer to the bearing shell;
wherein the at least one thrust bearing has an axial outer face with a first region thereof extending circumferentially from an end of the at least one thrust washer over a range having an angle (α) measuring 0 to 55°, and there are at least two sets of said corresponding notches and connecting pieces located within the range of said first region; and
wherein the contact surfaces of the at least two sets of corresponding notches and connecting pieces are parallel to one another.

2. The radial-axial bearing element according to claim 1, wherein the angle of the first region is 5 to 55°.

3. The radial-axial bearing element according to claim 1, wherein the contact surfaces of the at least two sets corresponding notches and connecting pieces in the first region are circumferentially spaced from one another by an angle (γ) of between 15° and 40°.

4. The radial-axial bearing element according to claim 1, wherein the radially inner edge of the at least one thrust bearing faces a center plane of the bearing element, and the contact surfaces of the at least two connecting pieces disposed in the first region face the center plane while the contact surfaces of the corresponding at least two notches disposed within the range of the first region face away from the center plane.

5. The radial-axial bearing element according to claim 1, including a second region and a third region of said at least one thrust bearing, wherein there is at least one additional set of the notches and connecting pieces disposed in a range of the second region and at least two additional sets of the notches and connecting pieces in a range of the third region.

6. The radial-axial bearing element according to claim 5, wherein the second region is arranged centrally between the first and third regions, with the range of the second region extending circumferentially over an angle (β) of between 50° and 130°.

7. The radial-axial bearing element according to claim 6, wherein the range of the third region extends over an angle (α') measuring 0 to 55°.

8. The radial-axial bearing element according to claim 5, wherein there are at least two sets of the notches and contact surfaces provided in the range of the second region.

9. The radial-axial bearing element according to claim 5, wherein the at least one set of notches and connecting pieces of the range of the second region are disposed circumferentially closer to one of the two sets of notches and connecting pieces that are in the range of the first and third regions.

10. The radial-axial bearing element according to claim 5, wherein the engaging surfaces of the set of two notches and connecting pieces disposed in the range of the first region are parallel to one another and the set of two notches and connecting pieces disposed in the range of the third region are parallel to one another.

11. The radial-axial bearing element according to claim 1, wherein the at least one thrust washer is joined to the bearing shell by a weld connection.

12. The radial-axial bearing element according to claim 11, wherein the weld connection is breakable during a start-up operation of the bearing element.

13. The radial-axial bearing element according to claim 1, wherein there are two of the thrust washers.

14. A thrust bearing, comprising:
a bearing shell having a concave sliding surface for slideably supporting a rotatable shaft;
at least one thrust washer projecting radially from the bearing shell and having an axial bearing face with a first end portion extending over a first angle α, a middle portion extending over an angle β, and a second end portion extending over an angle α', and wherein the angle β of the middle portion is greater than the angle α of the first end portion;
the first end portion includes at least two tabs received in corresponding notches provided in the bearing shell; and
wherein a range of the first angle α is 5 to 55° from an end of the at least one thrust washer.

15. The thrust bearing according to claim 14, wherein the tabs are of equal width.

16. The thrust bearing according to claim 15, wherein there are two additional tabs provided in the second end portion of the thrust washer, and at least one further tab provided in the middle portion, wherein the tabs are received in corresponding further notches provided in the bearing shell.

17. The thrust bearing of claim 16, wherein all of the tabs are of equal width.

18. A thrust bearing, comprising:
a bearing shell having a concave sliding surface for slideably supporting a rotatable shaft;
at least one thrust washer having an axial bearing face extending in a circumferential direction for engaging a portion of the rotatable shaft; said axial bearing surface having a first end portion extending over an angle α, a middle portion extending over an angle β, and a second end portion extending over an angle α'; wherein angle β is greater than angle α;
a plurality of tabs projecting from said thrust washer which are received in corresponding notches provided in said bearing shell to define a plurality of tab and notch sets for providing a connection between said bearing shell and said thrust washer;
each tab and notch set including facing surfaces that engage under load of the rotatable shaft to support the thrust bearing against rotation relative to the bearing shell; said facing surfaces defining a contact surface area;
wherein the number of tab and notch sets in a range of the first end portion extending over the angle α is greater than the number of tab and notch sets in a range of the middle portion extending over the angle β; and
wherein the facing surfaces of the tab and notch sets in the range of the first end portion are parallel to one another.

* * * * *